United States Patent
Duperon et al.

(10) Patent No.: US 9,707,496 B2
(45) Date of Patent: Jul. 18, 2017

(54) THIN PLATE APPARATUS FOR REMOVING DEBRIS FROM WATER

(76) Inventors: Terry L. Duperon, Saginaw, MI (US);
Michael A. Woodley, Saginaw, MI (US)

(*) Notice: Subject to any disclaimer, the term of this patent is extended or adjusted under 35 U.S.C. 154(b) by 1840 days.

(21) Appl. No.: 12/807,260

(22) Filed: Sep. 1, 2010

(65) Prior Publication Data
US 2011/0049039 A1    Mar. 3, 2011

Related U.S. Application Data

(60) Provisional application No. 61/275,657, filed on Sep. 2, 2009.

(51) Int. Cl.
| B01D 33/29 | (2006.01) |
| B01D 33/44 | (2006.01) |
| B01D 29/01 | (2006.01) |
| B01D 29/66 | (2006.01) |
| B01D 29/68 | (2006.01) |

(52) U.S. Cl.
CPC ............. B01D 29/01 (2013.01); B01D 29/66 (2013.01); B01D 29/684 (2013.01)

(58) Field of Classification Search
CPC ....... B01D 29/01; B01D 29/66; B01D 29/684
USPC .................................... 210/328, 791, 159
See application file for complete search history.

(56) References Cited

U.S. PATENT DOCUMENTS

| 2,751,087 A * | 6/1956 | Wallquist ...................... 210/387 |
| 2,804,209 A * | 8/1957 | Eastling et al. .............. 210/158 |
| 3,587,975 A * | 6/1971 | Moffett ...................... 239/428.5 |
| 3,731,814 A * | 5/1973 | Walters ........................ 210/411 |
| 4,186,091 A * | 1/1980 | Sutton .......................... 210/783 |
| 4,302,331 A * | 11/1981 | Condit, Jr. .................... 210/160 |
| 4,389,315 A * | 6/1983 | Crocket ........................ 210/357 |
| 4,443,421 A * | 4/1984 | Hollifield et al. ......... 423/321.1 |
| 4,472,273 A * | 9/1984 | Hagihara ...................... 210/159 |
| 5,407,563 A * | 4/1995 | Blake ............................ 210/155 |
| 5,425,875 A * | 6/1995 | Duperon ...................... 210/159 |
| 2007/0181710 A1* | 8/2007 | Meyer et al. ................. 239/159 |

* cited by examiner

*Primary Examiner* — Bobby Ramdhanie
*Assistant Examiner* — Denise R Anderson
(74) *Attorney, Agent, or Firm* — McKellar IP Law

(57) ABSTRACT

A product that is an apparatus for removing debris from water containing such debris using a perforated plate, a backer plate, and a skimmer, positioned adjacent the back of the perforated plate to provide a means of removing debris from the perforated plate without scraping the debris from the perforated plate, the skimmer bar and the backer plate being synchronized in their movement.

13 Claims, 10 Drawing Sheets

THIN PLATE APPARATUS FOR REMOVING DEBRIS FROM WATER

This application is a utility application claiming priority from U.S. Provisional patent application Ser. No. 61/275,657, filed on Sep. 2, 2009

The invention disclosed and claimed herein deals with a product that is an apparatus for removing debris from water containing such debris.

The essence of the invention is the use of a perforated plate and a backer plate positioned adjacent the back of the perforated plate to provide a means of removing debris from the perforated plate without scraping the debris from the plate.

BACKGROUND OF THE INVENTION

Submerged membrane bioreactors are one of the fastest growing treatment methods in wastewater. However, as is typical of all wastewater treatment processes, it is often the effectiveness of the preliminary liquids/solids separation operation, early in the influent journey that determines the efficiency of downstream processes.

Membrane bioreactors combine key aspects of the activated sludge treatment process with a physical membrane liquids/solids separation operation. The membrane component uses low pressure microfiltration or ultra filtration membranes to eliminate the need for clarification and tertiary filtration. Generally, the membranes are immersed in the aeration basin, although some applications use a separate membrane tank.

Aging infrastructure, more stringent effluent requirements and changing population demographics have driven dramatic growth in membrane bioreactors both in North America and throughout the World. Their increasing popularity results from the ability of bioreactor technology to achieve filtration at the micron level, as well as its ability to deliver high quality effluent in considerably less space than a conventional wastewater treatment plant.

However, when planning a bioreactor based treatment plant, one must balance preliminary liquids/solids separation options with issues such as cost, footprint, and energy consumption. Even though membrane bioreactors technology is continuing to evolve and make improvements in the cost-of-ownership equation, today it is widely recognized that the cost of building and operating a membrane bioreactor is typically higher than that of conventional processes. This additional cost is often mitigated, however, by the proven benefits of membrane bioreactors.

While there are several types of membrane units, each depend on the preliminary liquids/solids separation operation of mechanical screening. Membranes are particularly vulnerable to non-biological suspended solids. These solids are a natural part of wastewater and arrive at the treatment facility in the form of trash, hair, plastics, rags, and other physical contaminants. Such contaminants cause fouling or blockages as well as matting among the membrane fibers. The results of this fouling can range from increased energy consumption and permanent damage to the membrane, causing its removal from service.

Fouling also causes other compromises in operation capabilities, including restrictions to processing capacity, costs and time for backwashing, and plant downtime when off line for replacement or maintenance. It is the screening system that typically accounts for less than three one-hundredths of the membrane bioreactor investment that must remove these potentially damaging physical contaminates from the process prior to introduction of the flow into the membrane tank. It is the screen that must ensure material capture without bypassing or carryover to the downstream and it is the screen and its efficacy that determines the demand for downstream maintenance.

The perforated plate of the instant invention mitigates the problems of current perforated plate prior art devices. For example, the perforated plate of this invention does not use any dynamic seals that are subject to wear and failure. Seal failure results in downstream contamination which causes tangling or fouling of sensitive membrane filters. The orientation of the perforated plate of this invention to the flowing water in the water channel provides an efficient and simple installation and provides a passive cleaning mechanism that eliminates the need for maintenance intensive brushes Thus, it would be valuable to have a screening system that would not have the problems set forth above.

THE INVENTION

What is disclosed and claimed herein is a thin plate apparatus for removing solid debris from water containing such debris. The apparatus comprises a support frame consisting of two, parallel, spaced-apart vertical supports. The vertical supports are rigidly affixed to each other by rigid cross members.

The vertical supports each have a near end and a distal end, the distal end of each vertical support having a lateral support arm attached to it.

Each said lateral support arm has a downwardly depending set of posts, said posts being parallel to each other, said posts having attached thereto, a mounting plate, said mounting plate having an inside surface.

Each mounting plate has a centered opening in it, the center openings having one end of a common rotating shaft inserted in it.

There is mounted near the inside surface of each mounting plate, a square-tracked pulley and mounted on each such pulley, a drive chain comprised of rigid link bars being joined to each other such that each link bar pivotally interacts with adjacent link bars to form two adjacent drive chains that are attached to each other in a spaced-apart configuration by a plurality of rigid skimming bars. Each rigid skimming bar has a distal edge and mounted on each distal edge there is a soft, resilient skimming material, such as, for example, ultra high molecular weight polyethylene.

There is mounted near the distal end and between the vertical supports, a perforated plate, the perforated plate has a back and a multiplicity of such perforations therein in which the size of the perforations is calculated based on the formula:

$$\frac{\text{thickness of the plate}}{\text{hole size}} = 0.5 \text{ or less}$$

wherein the thickness of the perforated plate does not exceed ¼ of an inch.

There is a moveable solid effector plate mounted near the back of the perforated plate, said solid plate having a top end, and a front surface, a back surface, the front surface of the moveable solid effector plate is not touching the perforated plate, said moveable solid effector plate being movable up and down in essentially a vertical motion.

The movement of the moveable solid effector plate is provided by a lift and release mechanism, said lift and release mechanism comprising a lower pivotable support arm having near end and a distal end, the near end being pivotably mounted to the support frame, the distal end being pivotally mounted to a dampener means, said dampener means having a distal end, the dampener means being pivotally attached to the back surface of the moveable solid effector plate.

The top end of the moveable solid effector plate is pivotally coupled to a wiper blade, the wiper blade having a distal end. The distal end of the wiper blade is long enough to contact the top surface of a skimmer bar. A near arm of the wiper blade is coupled to an actuator cam, wherein the actuator cam can cause the wiper blade to scrape the top surface of the skimmer bar and cause the wiper blade to fall off the skimmer bar and allow the effector plate to drop by weight of gravity to its initial position at the base of the apparatus.

The wiper bar has rigidly mounted on it a linkage that is attached to an active component of the dampener means.

There is a drive means driveably connected to the common rotating shaft.

In another embodiment, there is a thin plate apparatus that corresponds to that set forth Supra, in which the apparatus comprises a rigid skimming bar having a corrugated distal edge and mounted on each corrugated distal edge, a soft, resilient skimming material. In this embodiment, there is mounted near the distal end and between the vertical supports, a corrugated perforated plate, said corrugated perforated plate having distal horizontal edges and a vertical distal edge and being configured to accept said rigid skimming bars.

In yet another embodiment, there is an apparatus having a corrugated perforated plate having, in addition, coarse screen components comprising solid vertical bars, wherein the solid vertical bars are located at the leading edges of the corrugations of the corrugated perforated plate and act as coarse screens for the apparatus.

In still another embodiment, there is an apparatus wherein there are valley plates built into the vertical edges of the corrugation of the perforated plate such that the valley plates are contacted by the distal vertical edge of the skimming bars such that the valley plate contacts provide stability to the skimmer bars.

DETAILED DESCRIPTION OF THE INVENTION

Figure 4:
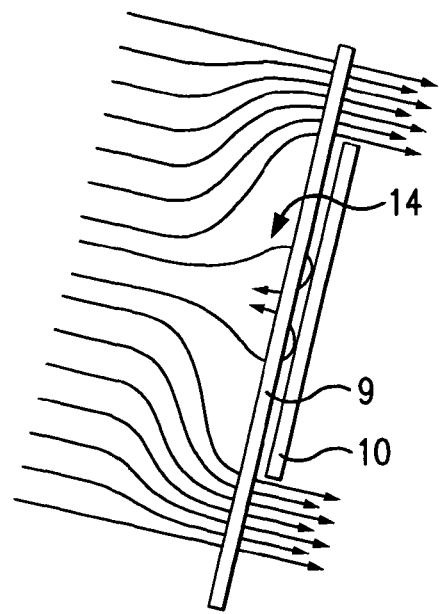
FIG. 4 is a diagram of the flow of water through the perforated plate.
Figure 12:
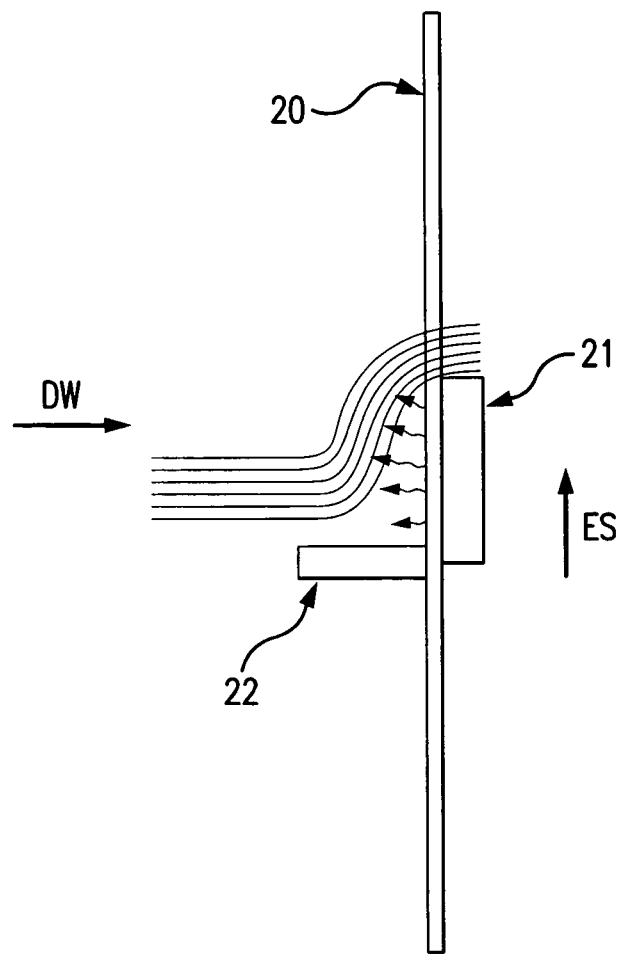
FIG. 12 is shows the dirty water flow hydropression effect.

For purposes of this invention, the term "hydropression effect" is used to denote the basis on which the invention is superior to prior art devices. Hydropression is the term coined by the inventors herein to describe the effect of the thin flat plate fluid dynamics, as applied to this invention and this method, i.e. perforated plate/ultra screening of solids from water. The hydropression effect is essentially a fluid mechanics transport effect. To create this effect, a thin flat plate is placed perpendicularly into a flowing fluid, and in this case, water. Positive pressure is created on the front of the plate and negative pressure is created on the back of the plate. An effector plate (described infra) on the back (negative pressure side of the plate) of the screen and a skimmer on the front side of the screen (positive), move in unison to create a pressure differential. This differential creates a deflected water flow that pushes debris up the screen and makes it available for collection by a skimmer or similar apparatus. The debris is then discharged and removed from the water channel. FIG. 4 shows this effect at 14. This hydropression effect is also shown in FIG. 12 wherein there is shown the dirty water flow by a large solid arrow designated as DW. There is shown a perforated plate 20, an effector plate 21 and a skimmer bar 22. The effector plate 21 and the skimmer bar 22 are synchronized in movement to optimize the cleaning of the perforated plate 20. They move in the direction of the large open arrow designated as ES.

Figure 1:
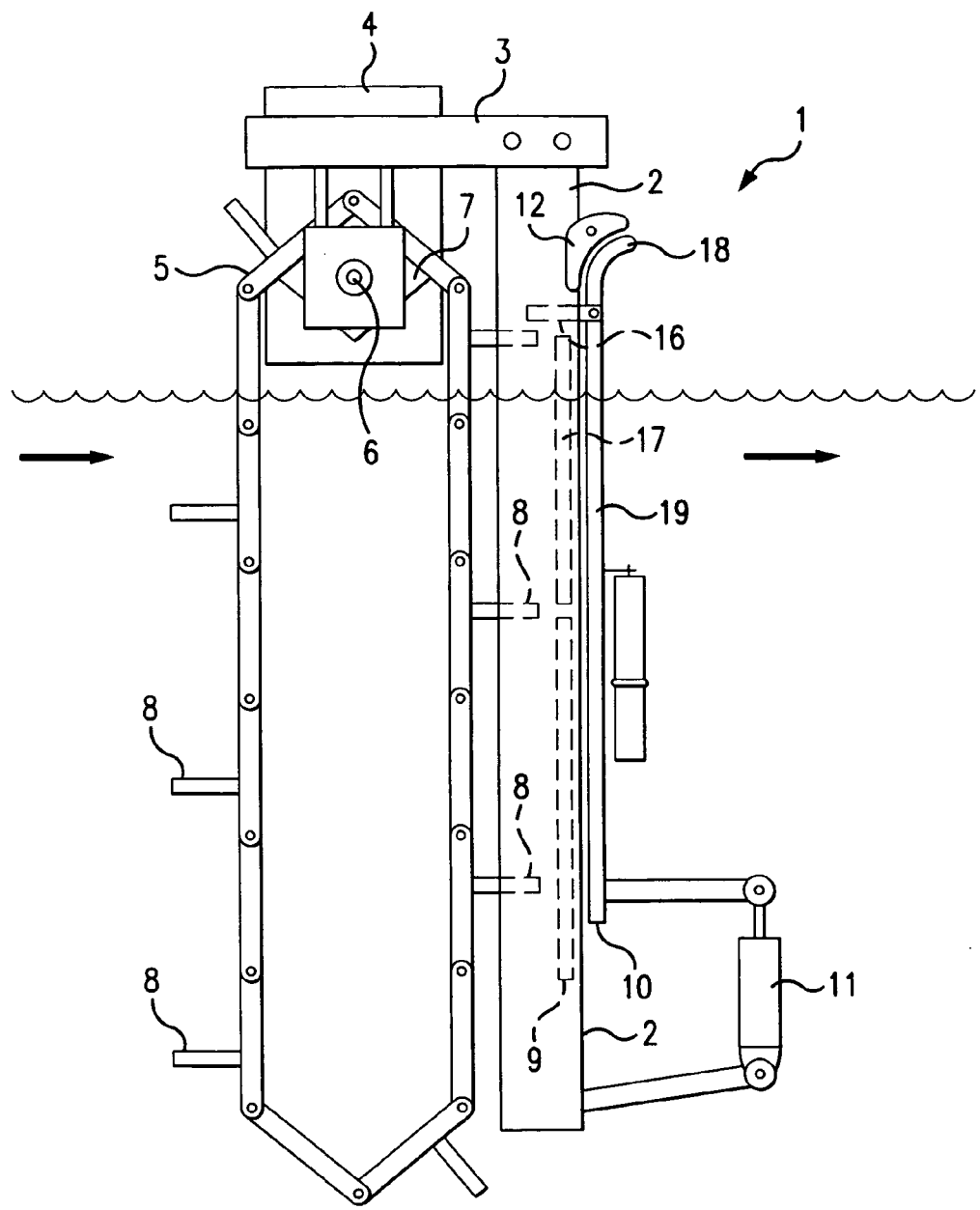
FIG. 1 is a side view of the major components of an apparatus of this invention without the housing in place.

Turning to FIG. 1, there is shown an apparatus 1 of this invention with the housing removed, along with a support frame showing a vertical post 2, a lateral top support arm 3, a motor mounting panel 4, a linked chain 5, a rotating shaft 6 for the pulleys 7, skimming bars 8, perforated plate 9, solid effector back plate 10, dampener means 11 and hook 12 on the top of the linkage 19. The linked chain 5 is very critical to the operation of this device. Such a chain can be found in U.S. Pat. No. 5,425,875, issued Jun. 20, 1995 for what it teaches about such chains. Said U.S. patent is incorporated herein by reference for what it teaches about such chains, their function, and advantages.

Also shown in FIG. 1 are a wiper blade 16, dead plate 17, and the actuator cam 18, all of which will be described infra.

Figure 2:
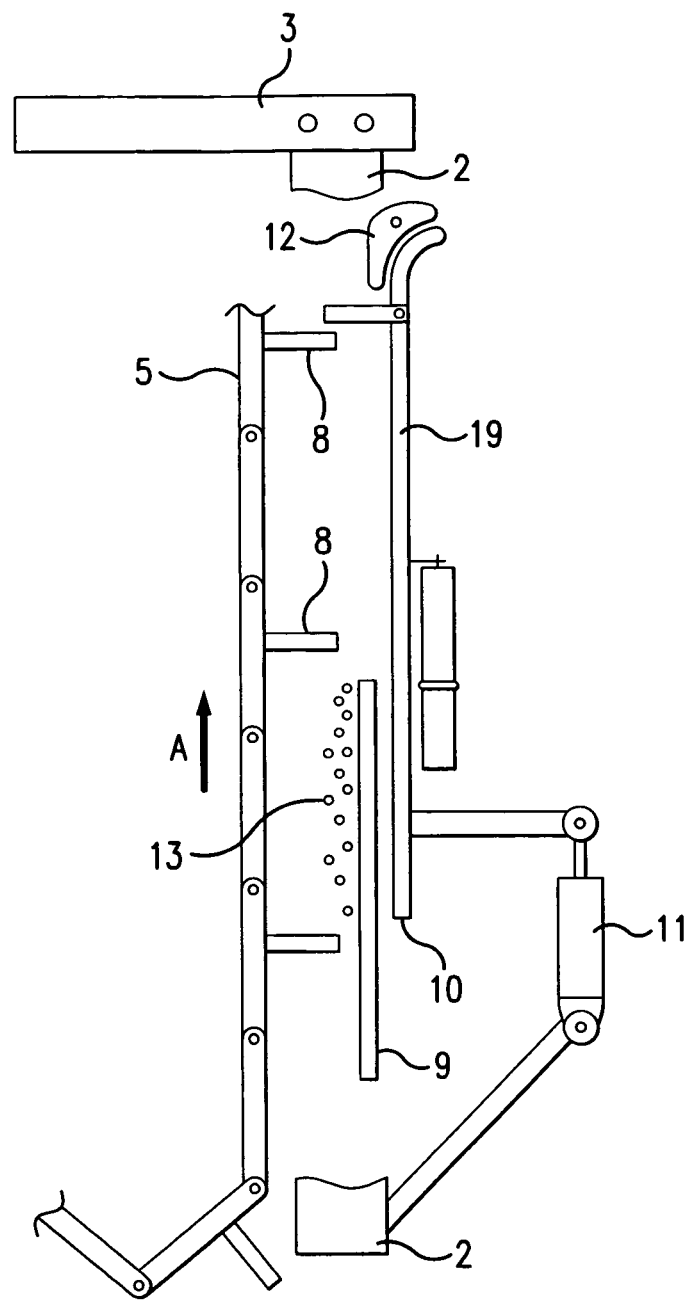
FIG. 2 is a side view of FIG. 1 with most of the vertical support removed and showing some partial components for clarity.

FIG. 2, wherein like numbers means like components as in FIG. 1, there is shown in addition, rolled or pilled particles 13, along with the linkage hook up of the dampener means 11 and the mechanism that controls the ascent and descent of the solid plate 10.

Figure 3:
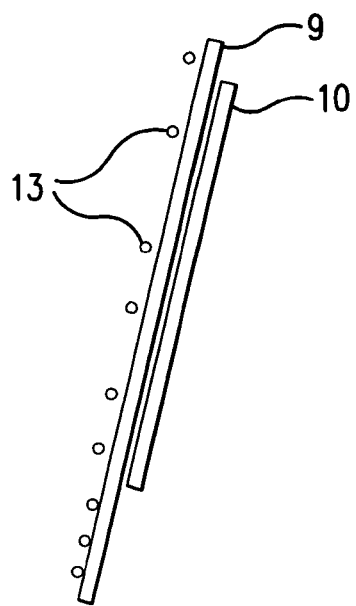
FIG. 3 is a full side view of the placement of the perforated plate and the solid effector plate showing rolls or pills of solids on the front surface of the perforated plate.

FIG. 3 is an illustration of the relationship of the flat perforated plate 9 and the solid plate 10 and in this Figure, there is also shown pilled or rolled solids material 13.

FIG. 4 is an illustration of the flow of water through the perforated plate 9 and around the solid plate 10 causing a hydropression (backwash) 14 in front of the perforated plated 9.

Figure 5:
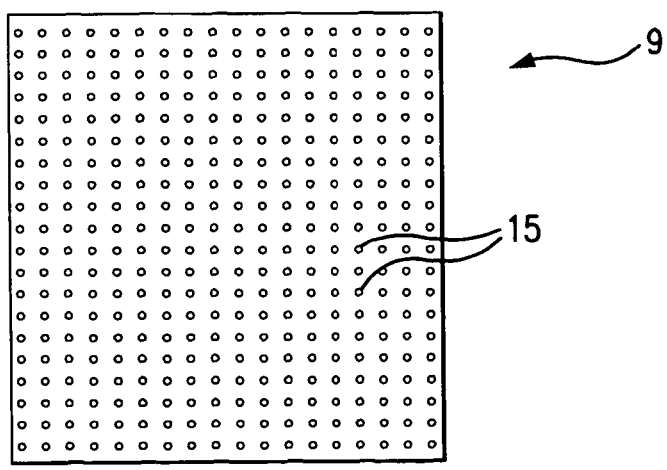
FIG. 5 is a full front view of a perforated flat plate of this invention.

FIG. 5 is a full front view of the perforated plate 9 showing the multiplicity of small openings 15 therethrough.

The size of the openings for the perforated plates of this invention is calculated by the formula $$\frac{\text{thickness of the plate}}{\text{hole size}} = 0.5 \text{ or less}$$

wherein the thickness of the perforated plate does not exceed ¼ of an inch.

In operation, and for illustration purposes, the flow of wastewater is from left to right in FIG. 4. Water passes through the perforated plate 9 where the solid plate 10 is not backing the perforated plate 9. In those areas where the solid plate 10 is backing the perforated plate 9, there is a backwash 14 which gently pushes the solid material 13 out of the openings 15 and back towards the flow of waste water. During this time, the skimming bars 8 are coordinated such that they follow the solid plate 10 and when a skimming bar 8 reaches the hook 12, the linkage 19 is released which in turn releases the solid plate 9 to drop back to the bottom and start its ascent over with the next skimming bar 8 that is in line.

The skimming bar 8 does not scrape the front of the perforated plate 9, but instead skims just short of the surface of the perforated plate 9 to remove the solids.

It has been discovered that the backwash 14 actually rolls the solid materials into a ball, which balls are separated from the openings 15 by the backwash 14 and float towards the upper surface of the waste water and then are moved along by the skimming bar 8 until the solids reach the top where they are moved off into a recovery device and disposed of.

Figure 6B:
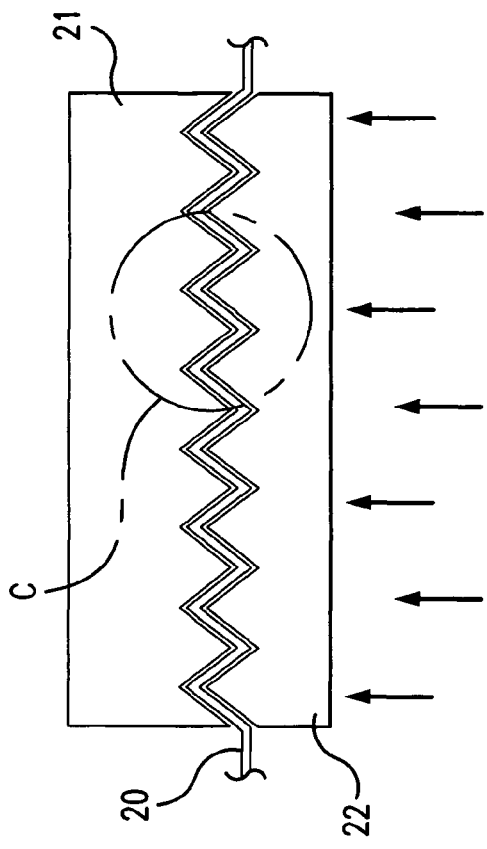
FIG. 6B is a cross sectional view of the apparatus of FIG. 6A in which the relationship of the components is shown.
Figure 6C:
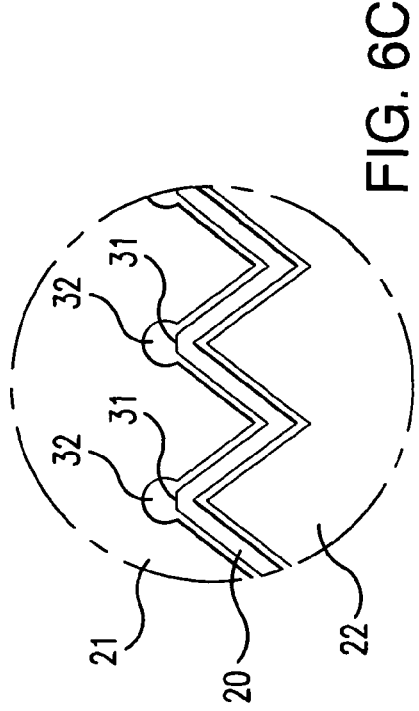
FIG. 6C is an enlargement of the area C shown in FIG. 6B.
Figure 6A:
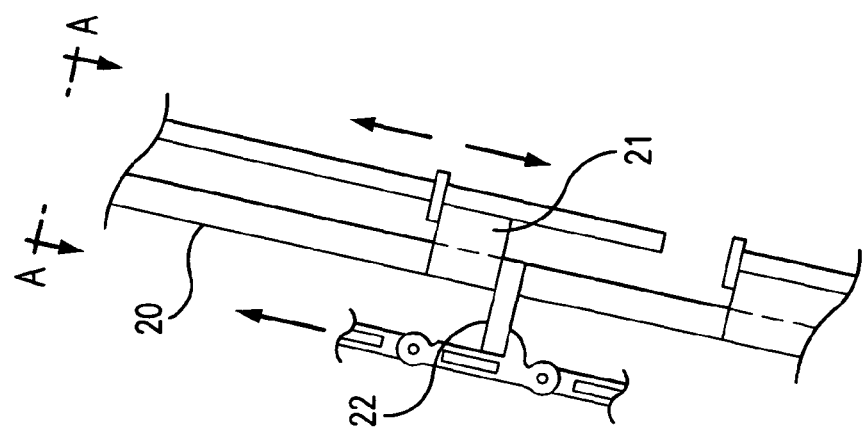
FIG. 6A is a section of the apparatus showing the corrugated configuration of the apparatus.

Turning now to a second embodiment of this invention, there is shown in FIG. 6A a portion of a corrugated system, that is, a corrugated perforated plate 20, corrugated effector plate 21, whose configuration matches that of the corrugated perforated plate 20, and a corrugated skimmer bar 22.

The purpose of the corrugation is at least three-fold, that is, the corrugation provides more surface area than does a flat plate; the corrugation creates more rigidity and therefore, stability of the plate, and it provides a basis for placing additional components into the apparatus to arrive at more benefits, all of which will be explained infra.

FIG. 6B is a section of the apparatus of FIG. 6A in which there is shown the skimmer 22, the effector plate 21 and the perforated plate 20, and this also show their relationship. Note from FIGS. 6B and 6C that the skimmer 22 does not touch the surface of the perforated plate and therefore, this is not a scraper mechanism. The effector plate 21 sets up against the back of the corrugated perforated plate 20. As can be noted in FIG. 10B, the configuration of the corrugated skimmer bars 22 entail a height, on average of 1.5 inches and this value can range from at least ½ inch and can be as high as 3 inches. This as opposed to a thin plate which would generally not have the required rigidity to provide the benefits cited herein.

Figure 7A:
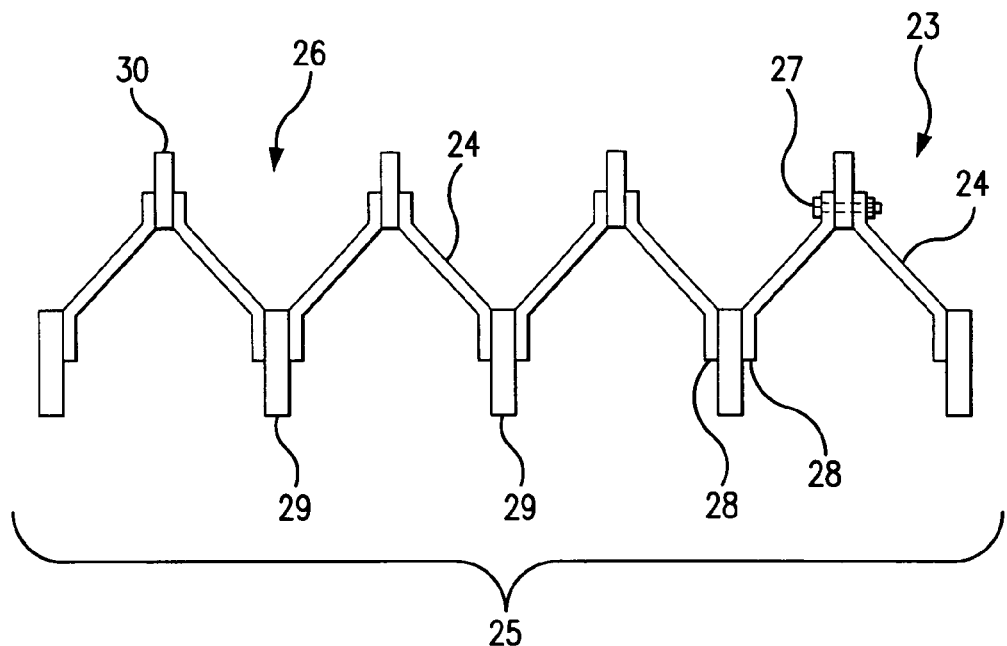
FIG. 7A is a top view of a portion of the corrugated fine screen/coarse screen of this invention.

Turning now to another embodiment of this invention which is a coarse screen in combination with a fine screen used as the perforated plate, the perforated plate 23 is shown in FIG. 7A. This plate 23 is shown as a corrugated plate, but can be manufactured as a flat plate 47 (FIG. 7B).

The perforated plate 23 is comprised of thin screen plate 24 and coarse screen bars 25, in which the thin screen plates 24 are connected together at the downside 26 by welding or by using a fastener 27 (only one example shown). As can be observed from FIG. 7A, one embodiment of the thin screen 23 forms a V-shape such that when they are put together, they create a corrugated screen. An additional embodiment of this screen is a flat screen 47 in combination with a flat solid effector plate 48. The solid bars 49 are the coarse screen for this configuration.

Figure 7B:
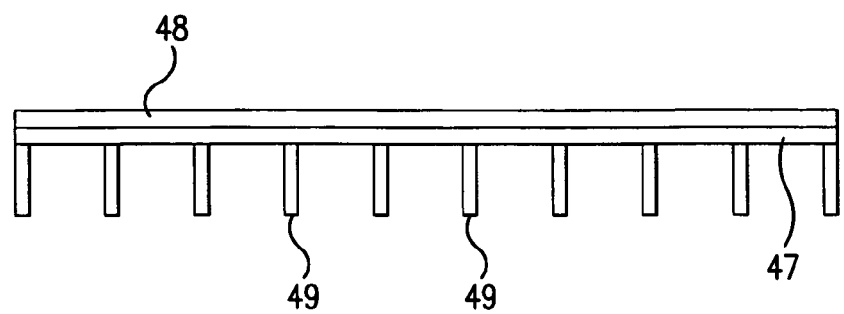
FIG. 7B is a top view of a portion of the flat fine screen/coarse screen of this invention.

FIG. 7B is a top view and shows a version of the flat screen 47, the solid bars 49, and flat effector plate 48 in combination.

At the leading edge 28 of the thin screens 24 (perforated plate material), and positioned between the leading edges 28 of the thin screens 24, are metal bars 29 which are vertically held between the leading edges 28 to form the coarse screen 25. These bars 29 constitute a coarse screen 25. There is also a component 30, which is a metal bar that is used to maintain the correct distances between the fine screens 24 and to provide stability to device. The thin screen/coarse screen is not easily manufactured, and the use of the bars 30 help ease the manufacturing process.

The coarse screen 25 screens out cloth, paper, wood and other larger sized particles from the water flow before those materials encounter the thin screens 23 and therefore prevent early clogging of the thin screens 23.

In use, these fine screen/coarse screens are substituted in the apparatus for the perforated plates set forth and described above.

Turning now to another embodiment of this invention, there is shown in FIG. 6C the use of valley plates 31. The valley plates 31 are located in the tip end 32 of the perforated plates 20. The skimmer 22 does not touch the perforated plate 20, but rather, the skimmer 22 rides on the valley plates 31 and by this mechanism, there is created a gap between the perforated plate 20 and the skimmer 22. This gap allows for debris to be rolled up the perforated plate 20. The effector plate 21 is not touching the perforated plate and does not have contact with the backside of the perforated plate 20.

Figure 8:
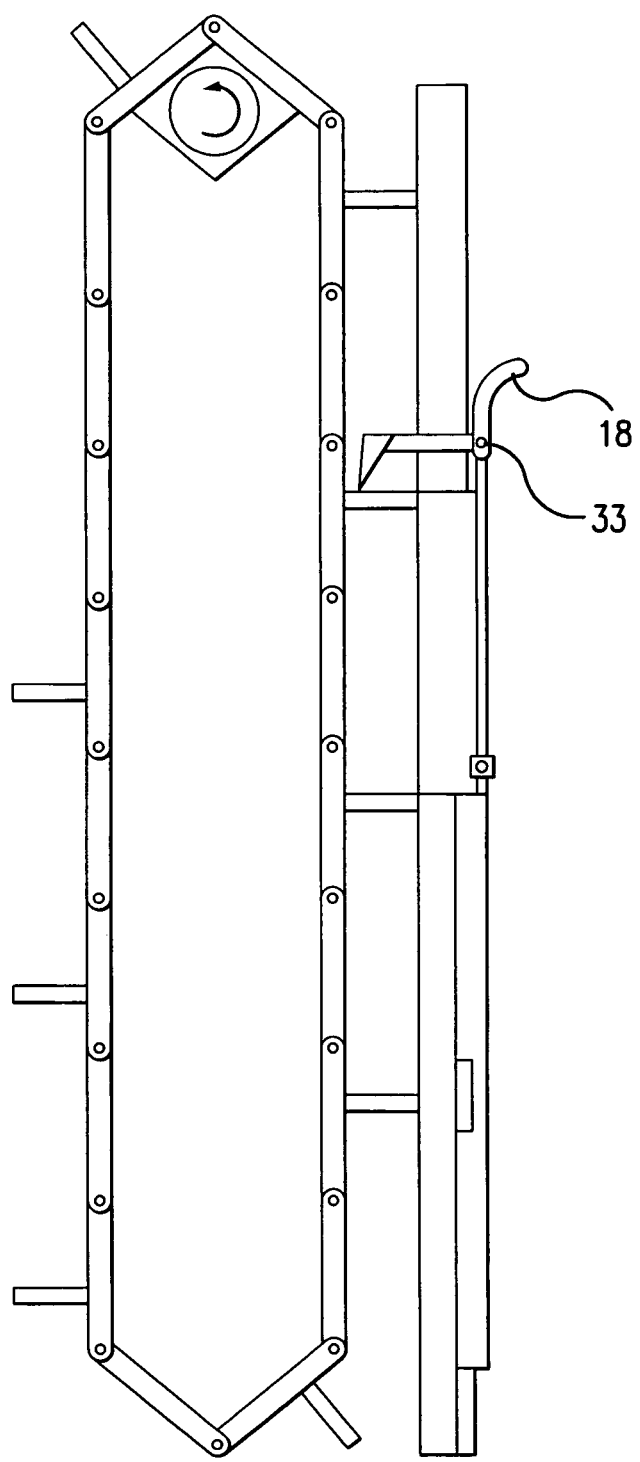
FIG. 8 is the intimate detail of the linkage associated with the wiper blade actuation

FIG. 8 deals with the intimate detail of the linkage associated with the wiper blade actuation. The interface between the skimmer 20 and the wiper blade 16 actuates the effector plate 21 via a linkage 33. The actuator cam 18 causes the wiper blade 16 to scrape clean the skimmer 22. The actuator cam 18 also causes the wiper blade 16 to fall off the skimmer 22 which allows gravity to cycle the effector actuator back to its initial condition. The skimmers 22 and the effector plates 21 require synchronization.

Figure 9:
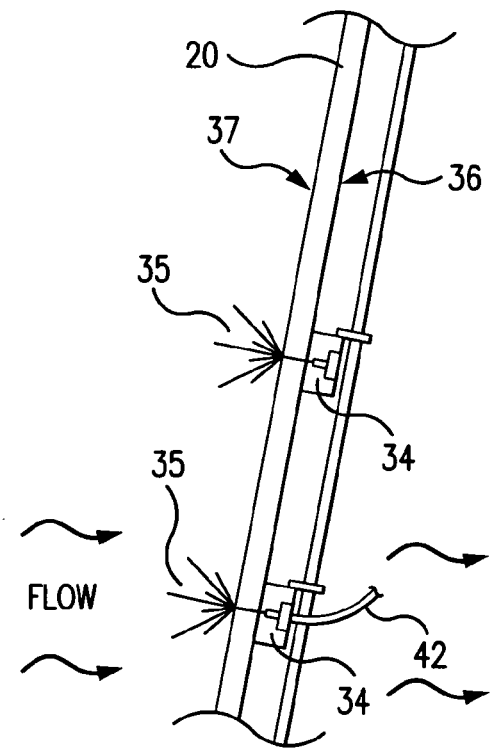
FIG. 9 is a section of a perforated plate showing the water supply against the perforated plate.

With regard to the use of water in conjunction with the perforated plates of this invention, attention is directed to FIG. 9 wherein there is shown a section of a perforated plate 20. In addition, there is shown a series of water supply nozzles 34. Not shown is the means by which the water is supplied to the nozzles 34, however, there is shown a hose 42. As noted, the nozzles 34 are intimately located behind the perforated plate 20 and supply pressurized water 35 to the back surface 36 of the perforated plate 20. The purpose of this water supply is to pressure the solids that become stuck in the perforations of the perforated plate 20. The water is synchronized to pressurize just as the skimmer bars 22 (not shown) are rising on the perforated plate 2 such that the solids are suspended in the flowing water at the front surface 37 of the perforated plate 20 such that the skimmer bars 22 (not shown in this Figure) can move the solids upwards along the front surface of the perforated plate 20. By this means, the hydropression effect is enhanced.

Figure 10A:
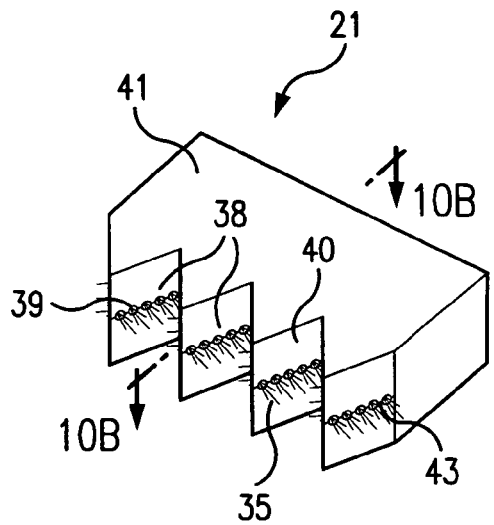
FIG. 10A is a view in perspective of a portion of an effector plate of this invention.

Also contemplated within the scope of this invention is to provide corrugated water supply nozzles 38 that are located in the effector plate 21, shown in FIG. 10A, wherein the water 35 is supplied to the back surface 36 of the perforated plate 20. As can be noted from FIG. 10A, which is a view in perspective of a portion of an effector plate 21, the nozzles 38 are in the form of openings 39 in a mid-line 43 of the front face 40 of the effector plate 21.

Figure 10B:
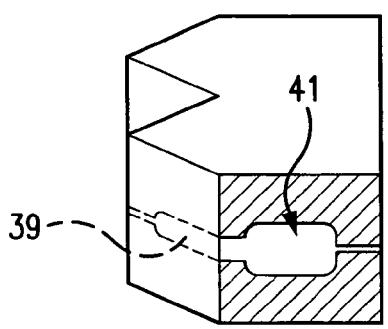
FIG. 10B is a cross section of the device of FIG. 10A through line B-B of FIG. 10A and shows the detail of the cavity and openings of a water supply system.
Figure 10C:
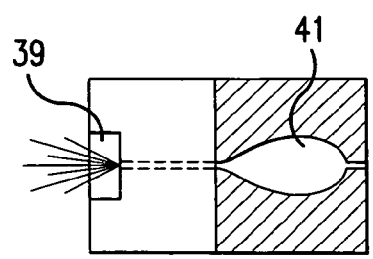
FIG. 10C is a section of a section of FIG. 10B showing the detail of the nozzle configuration.

FIG. 10B is a cross section of the device of FIG. 10A through line B-B and shows the detail of the cavity 41 and openings 39. Note in FIG. 10C, an alternative opening configuration in opening 39.

As noted Supra, in this configuration of nozzles operates in the same manner, by forcing water against the back surface of the perforated plate 20 to create an enhance hydropression effect.

Figure 11:
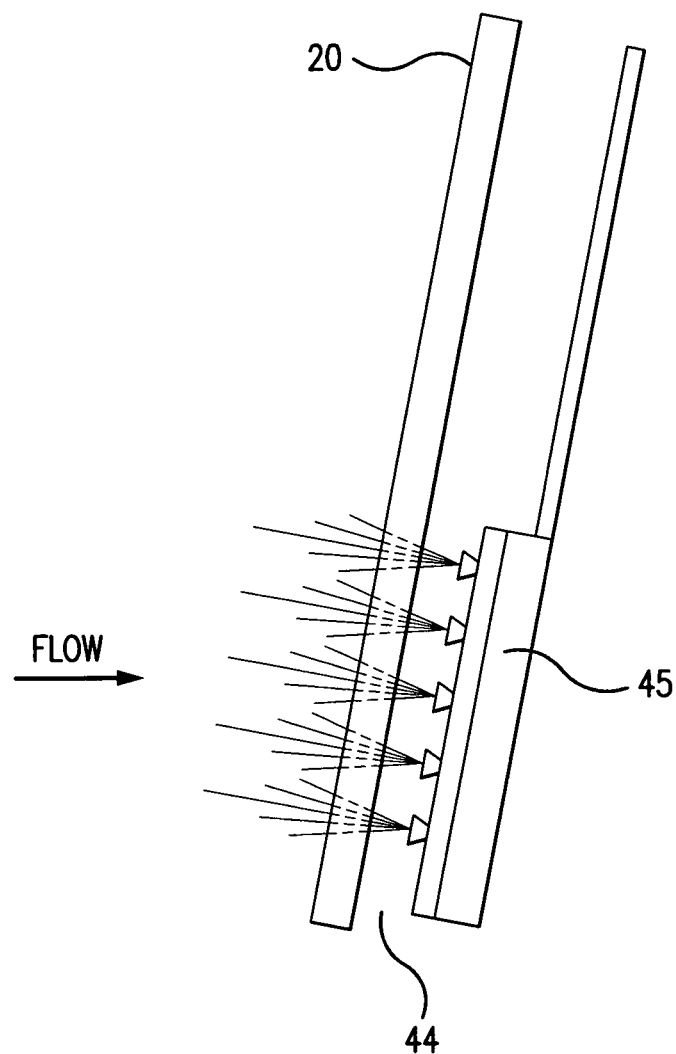
FIG. 11 is another configuration of water supply to the back surface of a perforated plate.

In yet another embodiment of this invention, there is shown in FIG. 11 another configuration of water supply 45 to the back surface 36 of a perforated plate 20. This configuration depends on the velocity of the water, not water pressure. Note that the configuration shown in FIG. 10A shows the water supply 34 as being closely associated with the back surface 36 of the perforated plate 20 whereas in this configuration, the water supply 45 is not closely associated with the back surface 36, but shows a gap 44 between the water supply 45 and the back surface 36 of the perforated plate 20. This configuration can be used on flat perforated plates and on corrugated perforated plates. The type of the water supply 45 is not critical in this configuration as long as the water supply 45 can provide sufficient velocity to the water and thus, the designation 45 is for a generic water supply.

Figure 13:
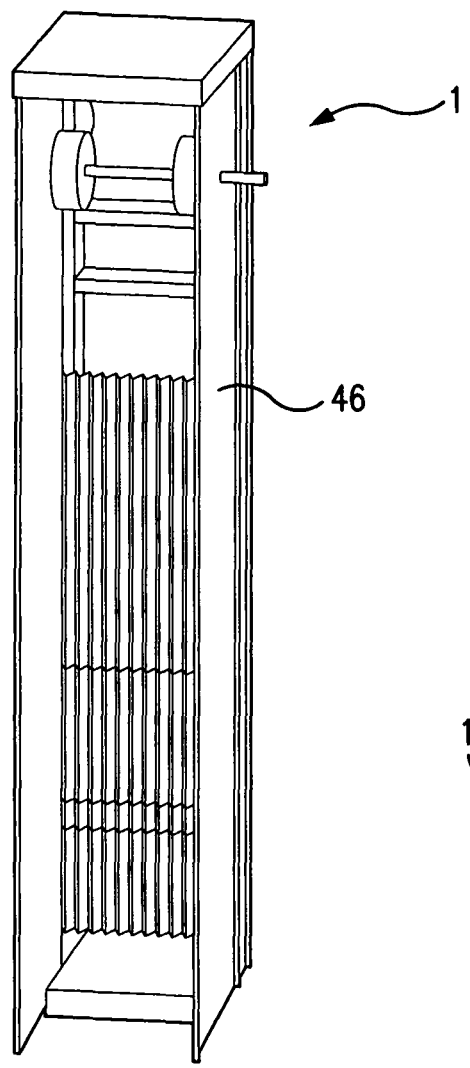
FIG. 13 is a full front view in perspective of a device of this invention with the housing intact.

FIG. 13 is a full front view in perspective of a device of this invention with the housing 46 intact.

Figure 14:
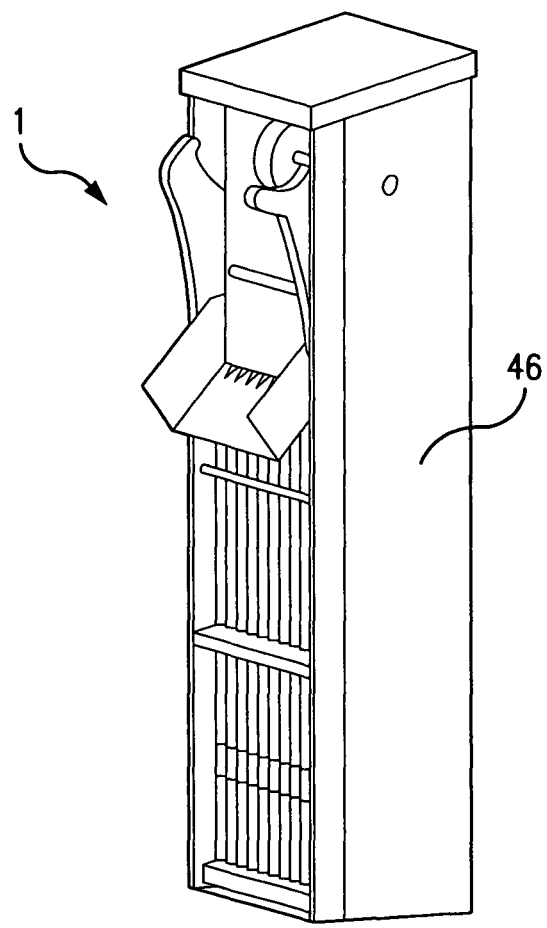
FIG. 14 is a full rear view in perspective of the device of FIG. 13 with the housing intact.

FIG. 14 is a full rear view in perspective of the device of FIG. 13.

The perforated plates of this invention can be manufactured from any water impermeable building material and that can be, for example, wood, plastic, webbed textile, mesh, netting, or metal, wherein for this invention, preferred is metal.

What is claimed is:

1. A thin plate apparatus for removing solid debris from water containing such debris, said apparatus comprising:
    a support frame consisting of two, parallel, spaced-apart vertical supports, said vertical supports being rigidly affixed to each other by rigid cross members;
    said vertical supports each having a near end and a distal end, the distal end of, each vertical support having a lateral support arm attached thereto;
    each said lateral support arm having a downwardly depending set of posts, said post being parallel to each other, said posts having attached thereto, a mounting plate, said mounting plate having an inside surface;
    each mounting plate having a centered opening therein, said center openings having one end of a common rotating shaft inserted therein;
    there is mounted near the inside surface of each mounting plate, a square-tracked pulley and mounted on each such pulley, a drive chain comprised of rigid link bars being joined to each other such that each link bar pivotally interacts with adjacent link bars to form two adjacent drive chains that are attached to each other in a spaced-apart configuration by a plurality of rigid skimming bars, each said rigid skimming bar having a corrugated distal edge and mounted on each corrugated distal edge, a soft, resilient skimming material;
    there being mounted near the distal end and between the vertical supports, a corrugated perforated plate, said corrugated perforated plate having distal horizontal edges and a vertical distal edge and being configured to accept said rigid skimming bars, and having a back, and a plurality of such perforations therein in which the size of the perforations is calculated based on the formula:

$$\frac{\text{thickness of the plate}}{\text{hole size}} = 0.5 \text{ or less}$$

wherein the thickness of the perforated plate does not exceed ¼ of an inch;
    a moveable solid effector plate mounted near the back of the corrugated perforated plate, said moveable solid effector plate having a back surface, a top end, and a front surface, the front surface of the moveable solid effector plate not touching the perforated plate, said moveable solid effector plate being movable up and down in essentially a vertical motion in predetermined coordination with the corrugated skimmer bars;
    the movement of the moveable solid effector plate being provided by a lift and release mechanism, said lift and release mechanism comprising a lower pivotable support arm having near end and a distal end, the near end being pivotably mounted to the support frame, the distal end being pivotally mounted to a dampener means, said dampener means having a distal end, the dampener means being pivotally attached to the back surface of the moveable solid effector plate;
    the top end of the moveable solid effector plate being pivotally coupled to a wiper blade, the wiper blade having a distal end, the distal end of the wiper blade long enough to contact the top surface of a skimmer bar, a near arm of the wiper blade being coupled to an actuator cam, wherein the actuator earn can cause the wiper blade to scrape the top surf ace of the skimmer bar and cause the wiper blade to fall off the skimmer bar and allow the effector plate to drop by weight of gravity to its initial position at the base of the apparatus;
    the wiper blade having rigidly mounted thereon, a linkage that is attached to an active component of the dampener means;
    a drive means driveably connected to the common rotating shaft.

2. The thin plate apparatus as claimed in claim 1 in which the thin plate apparatus is equipped with water supply mechanisms that are arranged against the back surface of the corrugated perforated plate and which are coordinated such that they move in a vertical direction with the movement of the moveable solid effector plate.

3. The thin plate apparatus as claimed in claim 1 in which the thin plate apparatus is equipped with water supply mechanisms in which the water supply mechanisms are located within the moveable solid effector plate.

4. The thin plate apparatus as claimed in claim 1 in which the thin plate apparatus is equipped with water supply mechanisms that are arranged adjacent the back surface of the perforated plate such that there is gap between the water supply mechanism and the back surface of the perforated plate.

5. The thin plate apparatus as claimed in claim 1 wherein the perforated plate is manufactured from metal.

6. In combination, a moveable solid effector plate mounted against the back of a flat perforated plate, said moveable solid effector plate having a back surface, a top end, and a front surface, the front surface of the moveable solid effector plate touching the perforated plate, said moveable solid effector plate being movable up and down in essentially a vertical motion in predetermined coordination with skimmer bars.

7. A rigid skimming bar, said rigid skimming bar having a corrugated distal edge and mounted on each corrugated distal edge, a soft, resilient skimming material.

8. A moveable solid effector plate, said effector plate having lift provided by a lift and release mechanism, said lift and release mechanism comprising a lower pivotable support arm having near end and a distal end, the near end being pivotably mounted to a support frame, the distal being pivotally mounted to a dampener means, said dampener means having a distal end, the dampener means being pivotally attached to the back surface of the moveable solid effector plate.

9. In combination, a thin plate apparatus equipped with a water supply mechanism that is arranged against the back surface of a corrugated perforated plate and which is coordinated such that said water supply mechanism moves in a vertical direction with the movement of a moveable solid effector plate.

10. In combination, a thin plate apparatus equipped with a water supply mechanism that is contained within the corrugated perforated plate.

11. In combination, a plurality of rigid skimmer bars and a corrugated perforated plate being configured to accept said rigid skimming bars, said corrugated perforated plate having a plurality of such perforations therein in which the size of the perforations is calculated based on the formula:

$$\frac{\text{thickness of the plate}}{\text{hole size}} = 0.5 \text{ or less}$$

wherein the thickness of the perforated plate does not exceed ¼ of an inch, said corrugated perforated plate having, in addition, coarse screen components comprising solid vertical bars, wherein the solid vertical bars are located at leading edges of the corrugations of the corrugated perforated plate.

12. A flat perforated plate having coarse screen components comprising solid vertical bars, wherein the solid vertical bars are independently spaced on a front surface of the flat perforated plate.

13. In combination, a corrugated perforated plate, said corrugated perforated plate having near horizontal edges and a distal vertical edge and being configured to accept rigid skimming bars, having a plurality of such perforations therein in which the size of the perforations is calculated based on the formula:

$$\frac{\text{thickness of the plate}}{\text{hole size}} = 0.5 \text{ or less}$$

wherein the thickness of the perforated plate does not exceed ¼ of an inch, said vertical distal edge having located therein, a valley plate, which valley plate contacts the distal vertical edge of the skimming bar.

\* \* \* \* \*